US012616638B2

(12) United States Patent
Kong et al.

(10) Patent No.: US 12,616,638 B2
(45) Date of Patent: May 5, 2026

(54) GAS CIRCUIT CONTROL SYSTEM OF PNEUMATIC CARDIOPULMONARY RESUSCITATION PRESSING DEVICE

(71) Applicant: Sunlife Science (Suzhou) Inc., Suzhou (CN)

(72) Inventors: Weifang Kong, Suzhou (CN); Eric Zhang, Suzhou (CN); Zhiqing Fang, Suzhou (CN); Yueming Yan, Suzhou (CN); Zhiping Fang, Suzhou (CN)

(73) Assignee: SUNLIFE SCIENCE (SUZHOU) INC., Suzhou (CN)

( * ) Notice: Subject to any disclaimer, the term of this patent is extended or adjusted under 35 U.S.C. 154(b) by 897 days.

(21) Appl. No.: 17/796,290

(22) PCT Filed: Oct. 16, 2020

(86) PCT No.: PCT/CN2020/121610
§ 371 (c)(1),
(2) Date: Jul. 29, 2022

(87) PCT Pub. No.: WO2021/073615
PCT Pub. Date: Apr. 22, 2021

(65) Prior Publication Data
US 2023/0270624 A1      Aug. 31, 2023

(30) Foreign Application Priority Data
Oct. 17, 2019      (CN) ......................... 201910985916.X

(51) Int. Cl.
A61H 31/00          (2006.01)
G05D 16/20          (2006.01)

(52) U.S. Cl.
CPC ....... A61H 31/006 (2013.01); G05D 16/2022 (2019.01); G05D 16/2024 (2019.01);
(Continued)

(58) Field of Classification Search
CPC ........ A61H 31/00–007; A61H 2201/12; A61H 2201/1238; A61H 2201/1246;
(Continued)

(56) References Cited

U.S. PATENT DOCUMENTS 3,209,748 A * 10/1965 Thomas ............... A61H 31/005
128/DIG. 7
3,511,275 A * 5/1970 Hewson ............... A61H 31/008
601/106
(Continued)

FOREIGN PATENT DOCUMENTS

CN          2347018 Y      11/1999
CN          2648836 Y      10/2004
(Continued)

OTHER PUBLICATIONS

Office Action in corresponding Chinese patent application CN201910985916.X dated Jan. 19, 2024.

*Primary Examiner* — Rachel T Sippel
*Assistant Examiner* — Gwynneth L Howell
(74) *Attorney, Agent, or Firm* — HOWARD M COHN and Associates, LLC

(57)          ABSTRACT

A gas circuit control system of a pneumatic cardiopulmonary resuscitation pressing device, including a gas control valve communicating with a piston cylinder of the pneumatic cardiopulmonary resuscitation pressing device, wherein a spool of the gas control valve controls gas charging and discharging of the piston cylinder when reciprocating; and at least one end of the spool of the gas control valve is provided with a gas cavity, the gas cavity communicates with a gas source through a miniature electronic control valve, and the miniature electronic control valve controls gas charging and discharging of the gas cavity to drive the spool of the gas control valve to reciprocate.

6 Claims, 2 Drawing Sheets

(52) U.S. Cl.
CPC ................ *A61H 2201/1246* (2013.01); *A61H 2201/5056* (2013.01)

(58) Field of Classification Search
CPC ....... A61H 2201/5056; G05D 16/2022; G05D 16/2024; F15B 13/00–0431; F15B 2211/322; F15B 2211/327; F15B 2211/329; F15B 2211/355; F15B 2211/6355; F15B 2211/67; F15B 2211/8855; F16K 31/02
See application file for complete search history.

(56) References Cited

U.S. PATENT DOCUMENTS

| | | | |
|---|---|---|---|
| 3,512,522 A * | 5/1970 | Greenlee .............. | A61H 31/008 601/106 |
| 4,279,225 A | 7/1981 | Kersten | |
| 6,171,267 B1 * | 1/2001 | Baldwin, II .......... | A61H 31/00 601/106 |
| 6,772,784 B1 | 8/2004 | Jones et al. | |
| 8,734,370 B1 * | 5/2014 | Ignagni .............. | A61H 23/0263 601/149 |
| 9,198,826 B2 | 12/2015 | Banville et al. | |
| 2003/0066483 A1 | 4/2003 | Lee et al. | |
| 2004/0251440 A1 | 12/2004 | Gnadinger et al. | |
| 2007/0060826 A1 | 3/2007 | Krauter | |
| 2007/0093731 A1 * | 4/2007 | Warwick .............. | A61H 31/006 601/44 |
| 2008/0023661 A1 | 1/2008 | Gu et al. | |
| 2012/0019009 A1 | 1/2012 | Fong et al. | |
| 2012/0152368 A1 | 6/2012 | Ferraz et al. | |

FOREIGN PATENT DOCUMENTS

| | | | |
|---|---|---|---|
| CN | 2760256 | Y | 2/2006 |
| CN | 201108579 | Y | 9/2008 |
| CN | 101416917 | A | 4/2009 |
| CN | 101642408 | A | 2/2010 |
| CN | 202211845 | U | 5/2012 |
| CN | 202660036 | U | 1/2013 |
| CN | 202758649 | U | 2/2013 |
| CN | 104315198 | A | 1/2015 |
| CN | 2015113001 | A | 6/2015 |
| CN | 105106005 | A | 12/2015 |
| CN | 204921512 | U | 12/2015 |
| CN | 204985951 | U | 1/2016 |
| CN | 106481847 | A | 3/2017 |
| CN | 206347186 | U | 7/2017 |
| CN | 106996464 | A | 8/2017 |
| CN | 206918322 | U | 1/2018 |
| CN | 207033687 | U | 2/2018 |
| CN | 208204096 | U | 12/2018 |
| CN | 110584984 | A | 12/2019 |
| CN | 211023995 | U | 7/2020 |
| EP | 2114343 | A1 | 11/2009 |

* cited by examiner

GAS CIRCUIT CONTROL SYSTEM OF PNEUMATIC CARDIOPULMONARY RESUSCITATION PRESSING DEVICE

FIELD OF THE PRESENT DISCLOSURE

The invention relates to the technical field of cardiopulmonary resuscitation devices, in particular to a gas circuit control system of a pneumatic cardiopulmonary resuscitation pressing device.

BACKGROUND OF THE PRESENT DISCLOSURE

Cardiopulmonary resuscitation pressing devices are one of the most commonly used and most important devices for emergency medical aid. Cardiopulmonary resuscitation pressing devices are divided into a pneumatic type and an electric type according to power sources. The pneumatic pressing devices are well-developed, have a generally recognized clinical effect, and are preferred in the case of first aid in the hospital. The pneumatic pressing devices can be subdivided into gas control pneumatic pressing devices and electronic control pneumatic pressing devices according to control modes. The gas control pneumatic pressing devices have the advantages that they can be used as long as a gas source is available, and operation is easy. The disadvantages of gas control pneumatic pressing devices are that the compression rate and duty cycle are not stable enough, which may be affected by both temperature and the cleaning of the gas source, and it is hard to realize multiple pressing modes, so further development is basically difficult. The electronic control pneumatic pressing devices have been developed in recent years, which can ensure the stability and adjustability of the compression rate and duty cycle, and can realize various pressing modes.

The electronic control pneumatic pressing device needs a power supply. Considering the characteristics of clinical use, the cardiopulmonary resuscitation pressing device must use a battery as the power supply. Because gas charging and discharging need to be performed on a cylinder quickly in the pressing process, a large-flow electronic control valve is required, which usually requires a power of more than 3 W. In a pressing device, besides the electronic control valve, only a control circuit consumes power, and the control circuit is now capable of very low power consumption. Therefore, the power consumption in the electronic control pneumatic presser is mainly caused by the large-flow electronic control valve. The voltage of the large-flow electronic control valve is usually above 12 V, which also increases the complexity of a circuit. At present, large-flow electronic control valves are directly adopted by control actuators of the electronic control pneumatic pressing devices, which require great power that ordinary dry batteries cannot provide and only large-capacity lithium batteries can provide. However, the large capacity of lithium batteries will lead to greater volume and weight, which further limits clinical application. In addition, the lithium batteries have a self-discharge problem, which is unacceptable for the pressing device in a clinical standby state. Therefore, the practical application of the electronic control pneumatic pressing devices is greatly limited due to large power consumption.

SUMMARY OF THE PRESENT DISCLOSURE

Therefore, the technical problem to be solved by the invention is to overcome the above shortcomings of existing electronic control pneumatic cardiopulmonary resuscitation pressing devices by providing a gas circuit control system of a pneumatic cardiopulmonary resuscitation pressing device which can greatly save electricity.

In order to achieve the above purpose, the invention adopts the following technical scheme.

A gas circuit control system of a pneumatic cardiopulmonary resuscitation pressing device comprises a gas control valve communicating with a piston cylinder of the pneumatic cardiopulmonary resuscitation pressing device, wherein a spool of the gas control valve controls gas charging and discharging of the piston cylinder when reciprocating, at least one end of the spool of the gas control valve is provided with a gas cavity, the gas cavity communicates with a gas source through a miniature electronic control valve, and the miniature electronic control valve controls gas charging and discharging of the gas cavity to drive the spool of the gas control valve to reciprocate.

Preferably, the gas control valve is a single-way double-port gas control valve, two ends of the spool of the gas control valve are respectively provided with a first gas cavity and a second gas cavity, and a body of the gas control valve is provided with a gas control valve gas inlet, a gas control valve gas outlet and a gas control valve gas supply port; the gas control valve gas inlet communicates with a gas source, the gas control valve gas outlet communicates with the atmosphere, and the gas control valve gas supply port communicates with a gas circuit interface of the piston cylinder; the gas control valve gas supply port communicates with the gas control valve gas inlet or the gas control valve gas outlet when the spool of the gas control valve reciprocates; and the miniature electronic control valve is provided with two electronic control valve gas supply ports which respectively communicate with the first gas cavity and the second gas cavity, and the first gas cavity and the second gas cavity are subjected to gas charging and discharging alternately when a spool of the miniature electronic control valve reciprocates, so as to push the spool of the gas control valve to reciprocate.

Preferably, the two electronic control valve gas supply ports are a first gas supply port and a second gas supply port, the first gas supply port communicates with the first gas cavity, and the second gas supply port communicates with the second gas cavity; a valve body of the miniature electronic control valve is provided with a first gas inlet, a first gas outlet, a second gas inlet and a second gas outlet, the first gas inlet and the second gas inlet communicate with the gas source respectively, and the first gas outlet and the second gas outlet communicate with the atmosphere respectively; and when the spool of the miniature electronic control valve reciprocates, the first gas inlet communicates with the first gas supply port, the second gas outlet communicates with the second gas supply port, or the first gas outlet communicates with the first gas supply port, and the second gas inlet communicates with the second gas supply port.

Preferably, one end of the miniature electronic control valve is connected to a controller, and the controller drives the spool of the miniature electronic control valve to move to an end away from the controller; and the other end of the miniature electronic control valve is provided with a returning spring, and the returning spring abuts against the spool of the miniature electronic control valve returning to an end where the controller is located.

Preferably, one end of the spool of the gas control valve is provided with the gas cavity, and the other end of the spool of the gas control valve is provided with a gas control spool returning spring which abuts against the spool of the gas control valve returning to a side where the gas cavity is located.

Preferably, the miniature electronic control valve is provided with an electronic control valve gas supply port, an electronic control valve gas inlet and an electronic control valve gas outlet, the electronic control valve gas supply port communicates with the gas cavity, the electronic control valve gas inlet communicates with a gas source, and the electronic control valve gas outlet communicates with the atmosphere; when a spool of the miniature electronic control valve reciprocates, the electronic control valve gas supply port communicates with the electronic control valve gas inlet or the electronic control valve gas outlet; one end of the miniature electronic control valve is connected to a controller, and the other end of the miniature electronic control valve is provided with a returning spring; and the controller drives the spool of the miniature electronic control valve to move to a side away from the controller, and the returning spring drives the spool of the miniature electronic control valve to move to a side where the controller is located.

The invention has the following beneficial effects.

The gas circuit control system of a pneumatic cardiopulmonary resuscitation pressing device of the invention greatly reduces the power consumption of electronic control pneumatic pressing devices, solves the problem of insufficient electric power in clinical use of electronic control pneumatic pressing devices, and makes "precise pressing" truly popularized in clinical practice, thereby saving more critical patients' lives and generating great economic and social benefits.

BRIEF DESCRIPTION OF THE DRAWINGS

In order to make the content of the invention easier to understand, the invention will be explained in further detail below with reference to the accompanying drawings, in which.

Figure 1:
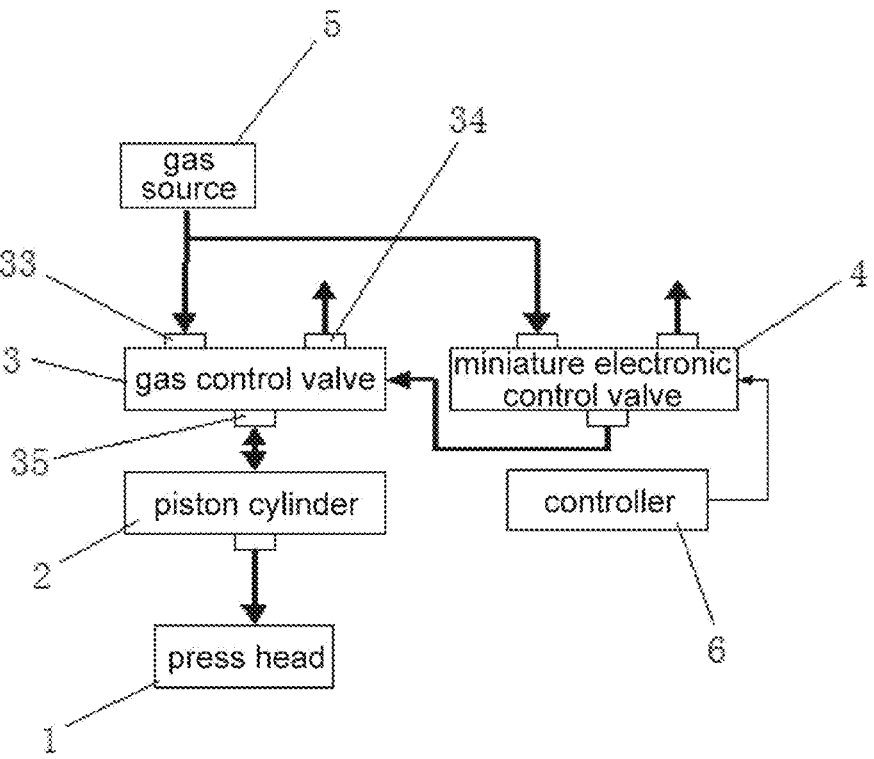
FIG. 1 is a schematic diagram of a gas circuit control system of a pneumatic cardiopulmonary resuscitation pressing device of the invention.

LIST OF REFERENCE NUMERALS IN THE DRAWINGS 1 press head
2 piston cylinder
3 gas control valve
31 first gas cavity
32 second gas cavity
33 gas control valve gas inlet
34 gas control valve gas outlet
35 gas control valve gas supply port
36 gas cavity
37 returning spring of gas control spool
38 spool of the gas control valve
4 miniature electronic control valve
41 first gas supply port
42 second gas supply port
43 first gas inlet
44 first gas outlet 45 second gas inlet
46 second gas outlet
47 returning spring
48 spool of the miniature electronic control valve
401 electronic control valve gas supply port
402 electronic control valve gas inlet
403 solenoid valve gas outlet
5 gas source
6 controller

DESCRIPTION OF THE EMBODIMENTS

The arrow direction in the figures indicates the gas flow direction. As shown in FIG. 1, a gas circuit control system of a pneumatic cardiopulmonary resuscitation pressing device of the invention comprises a gas control valve 3 communicating with a piston cylinder 2 of the pneumatic cardiopulmonary resuscitation pressing device, an ejection end of the piston cylinder 2 is connected to a press head 1, and a spool 38 of the gas control valve 3 controls gas charging and discharging of the piston cylinder 2 when reciprocating (reciprocating horizontally or vertically according to the setting direction of the gas control valve); and at least one end of the spool 38 of the gas control valve 34 is provided with a gas cavity, the gas cavity communicates with a gas source 5 through a miniature electronic control valve 4, and the miniature electronic control valve 4 controls gas charging and discharging of the gas cavity to drive the spool 38 of the gas control valve 3 to reciprocate, so as to realize gas charging or discharging of the piston cylinder to perform cardiopulmonary resuscitation pressing.

The gas circuit control system of a pneumatic cardiopulmonary resuscitation pressing device of the invention adopts a two-stage gas valve connection control structure to replace a large-flow electronic control valve, that is, the miniature electronic control valve is used to control the reciprocation of the spool of the gas control valve, so as to realize gas charging or discharging of the piston cylinder to perform cardiopulmonary resuscitation pressing. Rapid gas charging/discharging of the piston cylinder can be controlled by controlling the on/off of the miniature electronic control valve, so as to meet the requirements of pressing. The piston cylinder is driven and controlled by the large-flow gas control valve, and the movement of the spool of the large-flow gas control valve is controlled by the miniature electronic control valve. As the power consumption of the miniature electronic control valve is very low, which can basically be controlled under 0.3 W, and the voltage can be controlled within 6 V, and the large-flow gas control valve does not consume electric energy, and therefore electric energy is greatly saved. The driving power consumption of an electronic control pneumatic pressing device adopting the gas circuit control system of the invention is less than 10% of that of a traditional electronic control pneumatic cardiopulmonary resuscitation device, and the total power consumption (including a control circuit) is about 15% of power consumption before, so that electric energy can be greatly saved and the whole electronic control pneumatic cardiopulmonary resuscitation device is smaller and lighter.

The gas circuit control system of a pneumatic cardiopulmonary resuscitation pressing device of the invention greatly reduces the power consumption of electronic control pneumatic pressing devices, solves the problem of battery power supply in clinical use of electronic control pneumatic pressers, and makes "precise pressing" truly popularized in clinical practice, thereby saving more critical patients' lives and generating great economic and social benefits. The specific forms of the miniature electronic control valve and the gas control valve used in the gas circuit control system of a pneumatic cardiopulmonary resuscitation pressing device of the invention are not limited, as long as cardiopulmonary resuscitation pressing can be realized through two-stage linkage control of the piston cylinder. The principle of two-stage linkage control of the piston cylinder will be further explained in combination with the following two specific embodiments.

Embodiment 1

Figure 2:
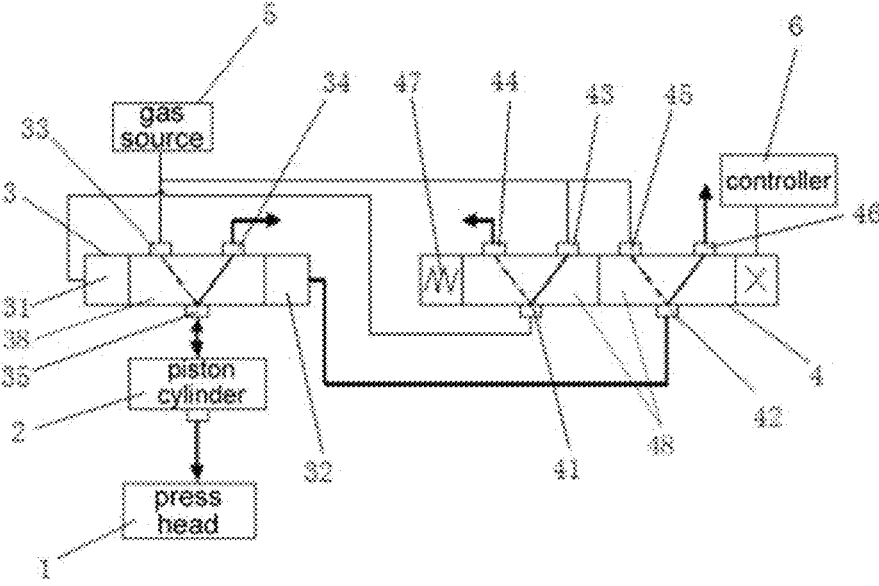
FIG. 2 is a structural diagram of a first embodiment of a gas circuit control system of a pneumatic cardiopulmonary resuscitation pressing device of the invention.

As shown in FIG. 2, the gas control valve 3 is a single-way double-port gas control valve. Two ends of the spool 38 of the gas control valve are respectively provided with a first gas cavity 31 and a second gas cavity 32. A body of the gas control valve is provided with a gas control valve gas inlet 33, a gas control valve gas outlet 34 and a gas control valve gas supply port 35. The gas control valve gas inlet 33 communicates with a gas source 5, the gas control valve gas outlet 34 communicates with the atmosphere, and the gas control valve gas supply port 35 communicates with a gas circuit interface of the piston cylinder 2. The gas control valve gas supply port 35 communicates with the gas control valve gas inlet 33 or the gas control valve gas outlet 34 when the spool of the gas control valve 3 reciprocates (horizontally in FIG. 2), so as to realize alternating gas charging and discharging of the piston cylinder. The miniature electronic control valve 4 is provided with two electronic control valve gas supply ports which respectively communicate with the first gas cavity 31 and the second gas cavity 32. The first gas cavity 31 and the second gas cavity 32 are subjected to gas charging and discharging alternately when a spool 48 of the miniature electronic control valve 4 reciprocates, so as to push the spool 38 of the gas control valve 3 to reciprocate, making the gas control valve gas supply port 35 communicate with the gas control valve gas inlet 33 or the gas control valve gas outlet 34.

In this embodiment, the two electronic control valve gas supply ports are a first gas supply port 41 and a second gas supply port 42. The first gas supply port 41 communicates with the first gas cavity 31, and the second gas supply port 42 communicates with the second gas cavity 32. A valve body of the miniature electronic control valve 4 is provided with a first gas inlet 43, a first gas outlet 44, a second gas inlet 45 and a second gas outlet 46. The first gas inlet 43 and the second gas inlet 45 communicate with the gas source 5 (the miniature electronic control valve 4 and the gas control valve 3 can share a gas source or connected to different gas sources), and the first gas outlet 44 and the second gas outlet 46 communicate with the atmosphere. When the spool 48 of the miniature electronic control valve 4 reciprocates (horizontally in FIG. 2), the first gas inlet 43 communicates with the first gas supply port 41, the second gas outlet 46 communicates with the second gas supply port 42. In this case, both the first gas outlet 44 and the second gas inlet 45 are in an off state. When the first gas supply port 41 charges gas to the first gas cavity through a pipeline and pushes the spool 38 of the gas control valve 3 to move to the right, gas in the second gas cavity 32 is discharged into the atmosphere through the second gas supply port 42 and the second gas outlet 46, so as to provide a stroke space for the spool of the gas control valve 3 to move to the right. When the first gas outlet 44 communicates with the first gas supply port 41 and the second gas inlet 45 communicates with the second gas supply port 42, gas from the gas source 5 enters the second gas cavity 32 through the second gas inlet 45 and the second gas supply port 42, and the spool 38 of the gas control valve is pushed to move to the left after gas enters the second gas cavity. At this point, gas in the first gas cavity 31 is discharged into the atmosphere through the first gas supply port 41 and the first gas outlet 44, so as to provide a stroke space for the spool of the gas control valve 3 to move to the left.

Referring to FIG. 2, in this embodiment, a right end of the miniature electronic control valve 4 is connected to a controller 6, and the controller 6 drives the spool 48 of the miniature electronic control valve 4 to move to an end (the left end in FIG. 2) away from the controller 6. The other end (the left end in FIG. 2) of the miniature electronic control valve 4 is provided with a returning spring 47, and the returning spring 47 abuts against the spool of the miniature electronic control valve returning to an end (the right end in FIG. 2) where the controller 6 is located. That is, after receiving an execution signal, the controller drives the spool 48 of the miniature electronic control valve to move to the left end in FIG. 2. At this point, the returning spring 47 is compressed to store energy, and the piston cylinder moves downward with the press head to complete the pressing action. When the controller releases the drive of the spool of the miniature electronic control valve, under the action of the returning spring 47, the spool 48 of the miniature electronic control valve is bounced to the right. At this point, gas in the piston cylinder is released, and under the action of chest elasticity, the press head drives the piston cylinder to rebound upwards. In this way, rapid gas charging/discharging of the cylinder can be controlled by controlling the on/off of the miniature electronic control valve, so as to meet the requirements of pressing.

Embodiment 2

Figure 3:
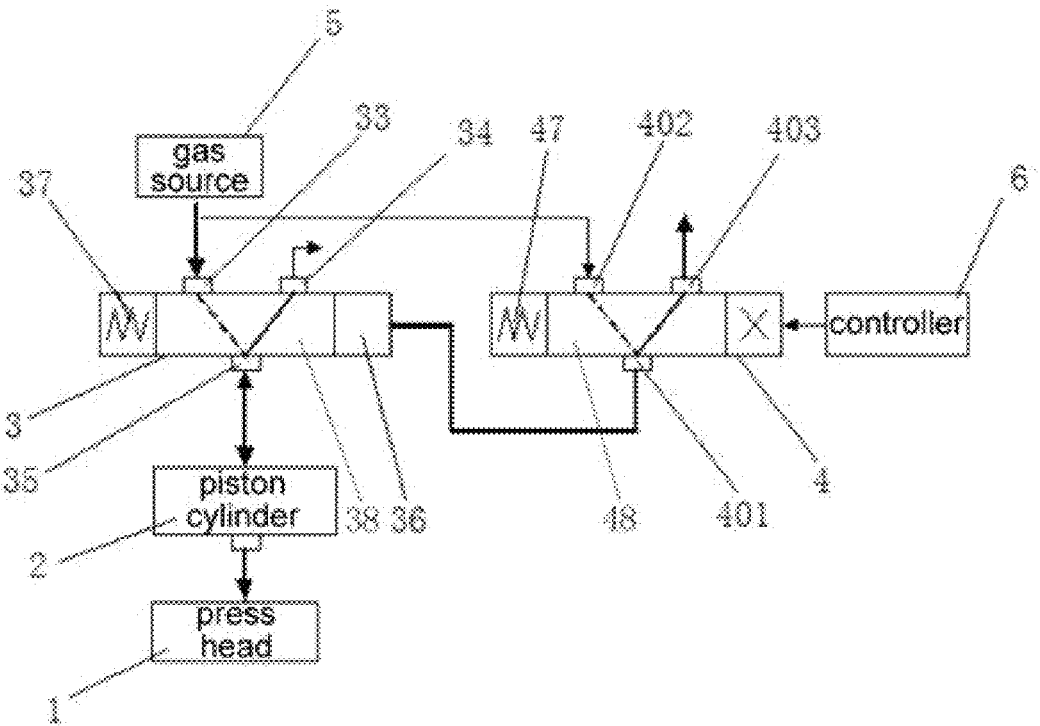
FIG. 3 is a structural diagram of a second embodiment of a gas circuit control system of a pneumatic cardiopulmonary resuscitation pressing device of the invention.

Referring to FIG. 3, as another embodiment of the invention, a right end of the spool 38 of the gas control valve 3 is provided with the gas cavity 36, and a left end of the spool 38 of the gas control valve 3 is provided with a gas control spool returning spring 37 which abuts against the spool of the gas control valve 3 returning to a side where the gas cavity 36 is located. The miniature electronic control valve 4 is provided with an electronic control valve gas supply port 401, an electronic control valve gas inlet 402 and an electronic control valve gas outlet 403. The electronic control valve gas supply port 401 communicates with the gas cavity 36, the electronic control valve gas inlet 402 communicates with a gas source 5, and the electronic control valve gas outlet 403 communicates with the atmosphere. When a spool 48 of the miniature electronic control valve 4 reciprocates, the electronic control valve gas supply port 401 communicates with the electronic control valve gas inlet 402 or the electronic control valve gas outlet 403. A right end of the miniature electronic control valve 4 is connected to a controller 6, and a left end of the miniature electronic control valve 4 is provided with a returning spring 47. The controller 6 drives the spool 48 of the miniature electronic control valve 4 to move to a side (the left side in FIG. 3) away from the controller, and the returning spring 47 drives the spool of the miniature electronic control valve to move to a side (the right side in FIG. 3) where the controller 6 is located.

When the controller 6 drives the spool of the miniature solenoid valve to move to the left, the returning spring 47 is compressed to store energy, and gas enters the gas cavity 36 through the electronic control valve gas inlet 402 and the electronic control valve gas supply port 401. The gas cavity 36 is filled with gas and pushes the spool 38 of the gas control valve 3 to move to the left. At this point, gas in the gas source 5 enters the piston cylinder through the gas control valve gas inlet 33 and the gas control valve gas supply port 35, and pushes the cylinder to move downward to drive the press head to press down to realize the pressing action. When the controller releases the spool of the miniature electronic control valve, the returning spring 47 drives the spool of the miniature electronic control valve to move to the right, and gas in the gas cavity 36 is discharged through the electronic control valve gas supply port and the electronic control valve gas outlet, so as to provide a stroke space for the spool of the gas control valve to move to the right. The gas control spool returning spring releases energy and pushes the spool of the gas control valve to move to the right, and gas in the piston cylinder is discharged through the gas control valve gas supply port and the gas control valve gas outlet. The press head and a piston rebound under the action of chest elasticity.

The miniature electronic control valve of this embodiment only needs to control one gas chamber on the gas control valve, so the structure of the selected miniature electronic control valve is simple, and a single-way double-port valve body (or equivalent structure) is enough. When an electromagnetic coil is not energized, the returning spring pushes the spool in the valve body to move to the right, so that the gas chamber of the large-flow gas control valve is emptied, and the cylinder is also emptied. When the electromagnetic coil is energized, the spool in the valve body is pushed to move to the left against a spring force, so that the gas chamber of the large-flow gas control valve is charged with gas, and the cylinder is also charged with gas. In this way, rapid gas charging/discharging of the cylinder can be controlled by controlling the on/off of the miniature solenoid valve, so as to meet the requirements of pressing.

The above-mentioned embodiments only explain the technical scheme of the invention in detail, and the invention is not limited to the above-mentioned embodiments. Those skilled in the art should understand that all improvements and substitutions based on the above-mentioned principles and spirit should be within the scope of protection of the invention.

What is claimed is:

1. A gas circuit control system of a pneumatic cardiopulmonary resuscitation pressing device, comprising:

a gas control valve communicating with a piston cylinder of the pneumatic cardiopulmonary resuscitation pressing device, wherein a spool of the gas control valve controls gas charging and discharging of the piston cylinder when reciprocating, at least one end of the spool of the gas control valve is provided with a gas cavity, the gas cavity communicates with a gas source through a miniature electronic control valve, and the miniature electronic control valve controls gas charging and discharging of the gas cavity to drive the spool of the gas control valve to reciprocate, wherein the gas control valve is a single-way double-port gas control valve, two ends of the spool of the gas control valve are respectively provided with a first gas cavity and a second gas cavity, and a body of the gas control valve is provided with a gas control valve gas inlet, a gas control valve gas outlet and a gas control valve gas supply port: the gas control valve gas inlet communicates with the gas source, the gas control valve gas outlet communicates with an atmosphere, and the gas control valve gas supply port communicates with a gas circuit interface of the piston cylinder: the gas control valve gas supply port communicates with the gas control valve gas inlet or the gas control valve gas outlet when the spool of the gas control valve reciprocates; and the miniature electronic control valve is provided with two electronic control valve gas supply ports which respectively communicate with the first gas cavity and the second gas cavity, and the first gas cavity and the second gas cavity are subjected to gas charging and discharging alternately when a spool of the miniature electronic control valve reciprocates, so as to push the spool of the gas control valve to reciprocate.

2. The gas circuit control system of the pneumatic cardiopulmonary resuscitation pressing device according to claim 1, wherein the two electronic control valve gas supply ports are a first gas supply port and a second gas supply port, the first gas supply port communicates with the first gas cavity, and the second gas supply port communicates with the second gas cavity; a valve body of the miniature electronic control valve is provided with a first gas inlet, a first gas outlet, a second gas inlet and a second gas outlet, the first gas inlet and the second gas inlet communicate with the gas source respectively, and the first gas outlet and the second gas outlet communicate with the atmosphere respectively; and when the spool of the miniature electronic control valve reciprocates, the first gas inlet communicates with the first gas supply port, the second gas outlet communicates with the second gas supply port, or the first gas outlet communicates with the first gas supply port, and the second gas inlet communicates with the second gas supply port.

3. The gas circuit control system of the pneumatic cardiopulmonary resuscitation pressing device according to claim 1, wherein one end of the miniature electronic control valve is connected to a controller, and the controller drives the spool of the miniature electronic control valve to move to an end away from the controller; and the other end of the miniature electronic control valve is provided with a returning spring, and the returning spring abuts against the spool of the miniature electronic control valve returning to an end where the controller is located.

4. The gas circuit control system of the pneumatic cardiopulmonary resuscitation pressing device according to claim 1, wherein one end of the spool of the gas control valve is provided with the gas cavity, and the other end of the spool of the gas control valve is provided with a gas control spool returning spring which abuts against the spool of the gas control valve returning to a side where the gas cavity is located.

5. The gas circuit control system of the pneumatic cardiopulmonary resuscitation pressing device according to claim 4, wherein the miniature electronic control valve is provided with an electronic control valve gas supply port, an electronic control valve gas inlet and an electronic control valve gas outlet, the electronic control valve gas supply port communicates with the gas cavity, the electronic control valve gas inlet communicates with the gas source, and the electronic control valve gas outlet communicates with the atmosphere; when a spool of the miniature electronic control valve reciprocates, the electronic control valve gas supply port communicates with the electronic control valve gas inlet or the electronic control valve gas outlet; one end of the miniature electronic control valve is connected to a controller, and the other end of the miniature electronic control valve is provided with a returning spring; and the controller drives the spool of the miniature electronic control valve to move to a side away from the controller, and the returning spring drives the spool of the miniature electronic control valve to move to a side where the controller is located.

6. The gas circuit control system of the pneumatic cardiopulmonary resuscitation pressing device according to claim 2, wherein one end of the miniature electronic control valve is connected to a controller, and the controller drives the spool of the miniature electronic control valve to move to an end away from the controller; and the other end of the miniature electronic control valve is provided with a returning spring, and the returning spring abuts against the spool of the miniature electronic control valve returning to an end where the controller is located.

\* \* \* \* \*